Dec. 24, 1968    A. E. MARTENS    3,417,476
DIGITAL MEASURING APPARATUS
Filed May 2, 1966    3 Sheets-Sheet 1

ALEXANDER E. MARTENS
INVENTOR.

BY Charles C. Krawczyk

ATTORNEY

Dec. 24, 1968  A. E. MARTENS  3,417,476
DIGITAL MEASURING APPARATUS
Filed May 2, 1966  3 Sheets-Sheet 2

ALEXANDER E. MARTENS
INVENTOR.
BY Charles C. Krawczyk
ATTORNEY

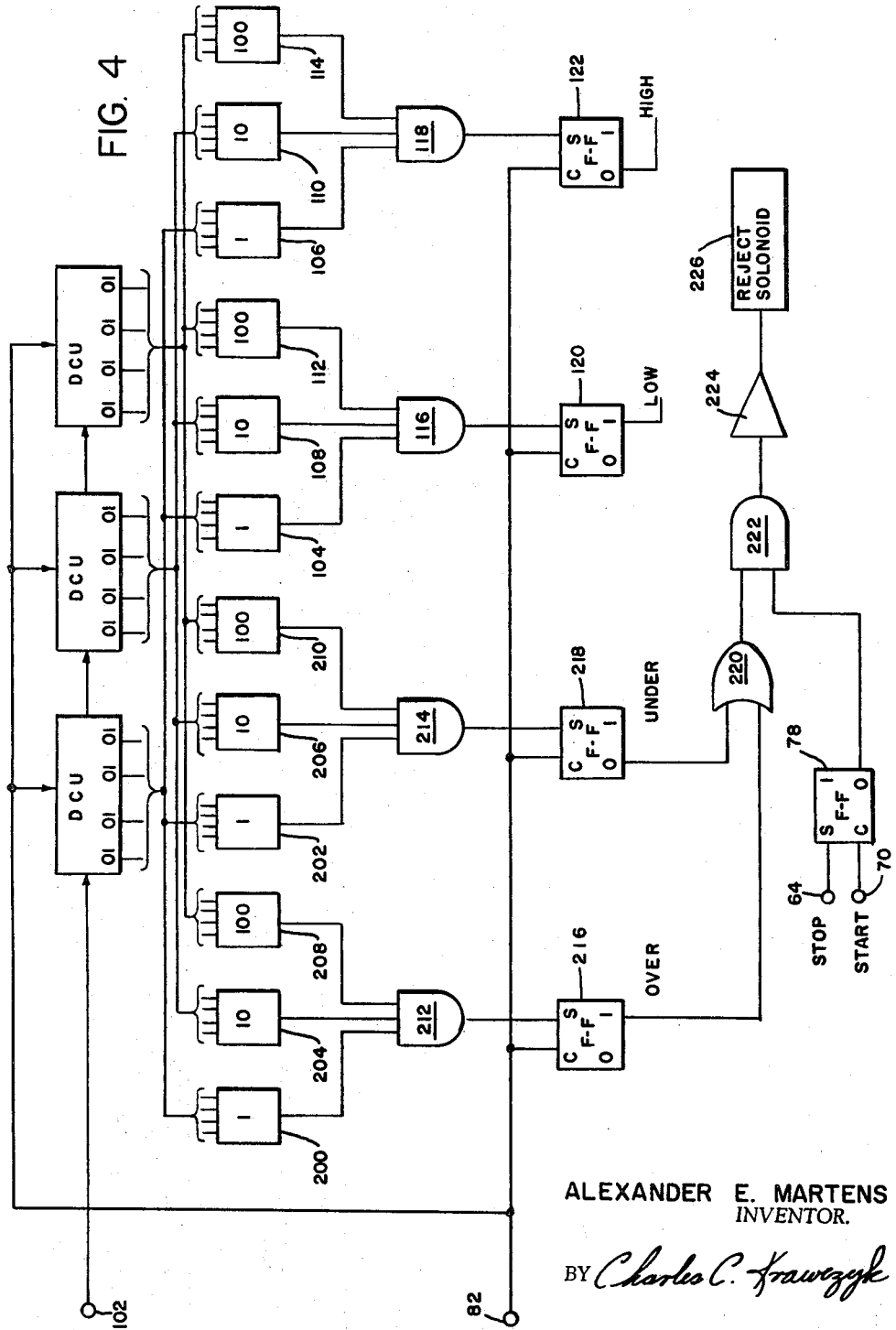

United States Patent Office 3,417,476
Patented Dec. 24, 1968

3,417,476
DIGITAL MEASURING APPARATUS
Alexander E. Martens, Greece, N.Y., assignor to Bausch & Lomb Incorporated, Rochester, N.Y., a corporation of New York
Filed May 2, 1966, Ser. No. 546,739
16 Claims. (Cl. 33—174)

This invention relates to measuring apparatus in general and more particularly to electrical apparatus for measuring devices having a dimension with a preset tolerance.

In high speed manufacturing processes wherein hundreds of devices are being formed per minute, it is extremely difficult, if not impossible, to measure the devices as they are being built (on the fly) and at the same time introduce signals to correct for errors. An added problem is present in the high speed manufacture of flexible devices, such as springs, etc. Due to the resiliency of such flexible devices, they do not generally assume their final shape until the manufacturing process is complete. The difficulty in a dynamic measurement arises from the necessity of measuring the device without constraining the device in any way so that a true reading may be made.

Most manufactured items are made with two sets of tolerances specified for each dimension to be controlled, a minimum and a maximum. If the dimensions fall within the tolerances, the device is acceptable, if not they are rejected. With slow speed manufacturing processes, an occasional spot check on the product produced is generally sufficient to provide information necessary to make corrections for any error. On the other hand, in high speed manufacturing processes, it is important to make a continuous check, or frequent sampling, governed by the production rate, on the product so that statistical error trends due to temperature, tool wear, etc. can be calculated and corrections introduced to compensate for a developing source of error before the tolerances are exceeded.

It is therefore an object of this invention to provide a new and improved electrical measuring circuit.

It is also an object of this invention to provide a new and improved electrical measuring circuit for measuring a device having a dimension with preset tolerance limits to determine whether the dimension falls within the preset limits.

It is also an object of this invention to provide a new and improved electrical measuring circuit for measuring a plurality of devices having dimensional tolerances and provide a digital measurement of average error therein.

It is also an object of this invention to provide a new and improved electrical measuring apparatus that is particularly adaptable to measurement of the dimensional tolerances of a plurality of flexible devices and provide a digital signal corresponding to the average error therein.

It is still a further object of this invention to provide a new and improved electrical measuring circuit adapted to be employed with automatic feed apparatus for sequentially receiving and measuring devices having dimensional tolerances and provide a digital measurement of the average error therein.

It is also an object of this invention to provide a new and improved electrical measuring circuit adapted to sequentially receive manufactured devices having dimensional tolerances or limits and make measurements thereof provide a digital feedback control signal corresponding to the average dimensional error in the devices.

It is also an object of this invention to provide a new and improved electrical measuring circuit adapted to be used in conjunction with high speed manufacturing processes to sequentially measure the devices manufactured having dimensional tolerance and provide a feedback to the manufacturing processes to make corrections in the processes according to an average error in the measured devices.

Electrical apparatus including the invention is adapted to be connected to receive devices, having a desired dimension and a preset tolerance, and provide an electrical signal when the dimensional variation of the device measured is beyond the preset tolerance. Measuring means are included that are adapted to receive the devices and generate electrical signal pulses corresponding to a measured dimension thereof. Circuit means are coupled to receive the electrical signal pulses to determine whether the measured dimension is within the preset limits and generate a control signal when the values are exceeded.

A further feature of the invention includes circuit means responsive to the control signal, for counting signal pulses corresponding to measured dimensions that do not meet the preset limits to provide a count corresponding to the accumulative variations beyond the limit for plurality of devices measured. The count is averaged over a number of devices measured to provide an error signal corresponding to the average dimensional variation beyond said preset limits.

A still further feature of the invention includes the application of the error signal to a control system coupled to control the position of a forming tool of the manufacturing process providing a feedback system for automatically compensating for the average error in the dimensions of the produced device.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

FIGURE 4 is a modification of a portion of the block diagram of FIGURE 3 including provision for rejecting defective units.

Figure 1:
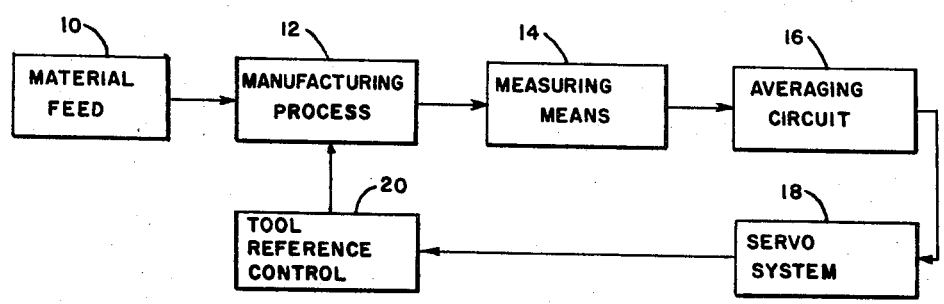
FIGURE 1 is a block diagram of a manufacturing process including the electrical measuring apparatus of the invention.

In the block diagram of FIGURE 1, a material feed mechanism 10 provides a continuous source of material for a high speed manufacturing process 12 of the type capable of producing hundreds of devices per minute. The manufacturing process 12 may for example be an automatic coil spring making machine that receives wire from the material feed mechanism 10 and forms the wire into a desired configuration. Such a process may include mechanical cam or electrical motor operated forming tools that are automatically positioned as the wire is fed in, to provide the correct diameter and pitch for the spring. After a sufficient amount of wire is fed into the manufacturing process to complete a spring, it is cut off to provide the desired length.

The manufacturing of such coil springs requires a flexible type material to provide the desired amount of resiliency in the completed spring. This resiliency creates a particular problem in obtaining a dynamic measurement during the manufacture thereof since the forming action of the tool generally constrains the spring. As a result, the final measurements must be made on a completed unconstrained spring. Furthermore, in the manufacturing processes wherein hundreds of devices are completed per minute, it is extremely difficult, if not impossible, to make dynamic measurements and make corrections thereon at the same time.

Devices, such as springs, are manufactured to a desired dimension, each having given minimum and maximum tolerances. The final formed device must conform within the tolerances or else be rejected. With high speed manufacturing processes it is highly desirable to provide a continuous check or frequent sampling governed by the production rate, on the completed product to provide an indication as to the dimensional trends and foreseeable sources of error before a large number of rejected units are made.

Such trends can not effectively be determined by occasionally measuring a single completed product and make corresponding corrective changes since the measured dimensions of flexible devices may vary from unit to unit. A trend, or source of errors, can be recognized by a continuous check, or frequent sampling governed by the production rate on a plurality of devices, to obtain a measurement of an average value of deviations about the desired dimensions. With this type of measurement a true correction can be made to compensate for a source of, or potential source of, errors.

The manufactured devices, or selected ones (every second, or third, etc.) produced by the manufacturing process 12, may be conventionally automatically fed into the measuring area of a measuring means 14 of the apparatus including the invention. A measurement of a given dimension is made in the measuring area and a corresponding electrical signal is generated. The electrical signal is applied to an averaging circuit 16 wherein an error signal is developed corresponding to the average dimensional variation of a plurality of tested devices about the desired dimension. The error signal is applied to a servo system 18 which in turn is coupled to drive the tool reference control 20, which corrects the position of the forming tool in the manufacturing process 12 corresponding to the average error in the dimension being measured. Although only one control feedback loop is illustrated in FIGURE 1, it is to be understood that any number of such separate control loops may be included to drive a forming tool or tools corresponding to a plurality of dimensions being measured.

Figure 2:
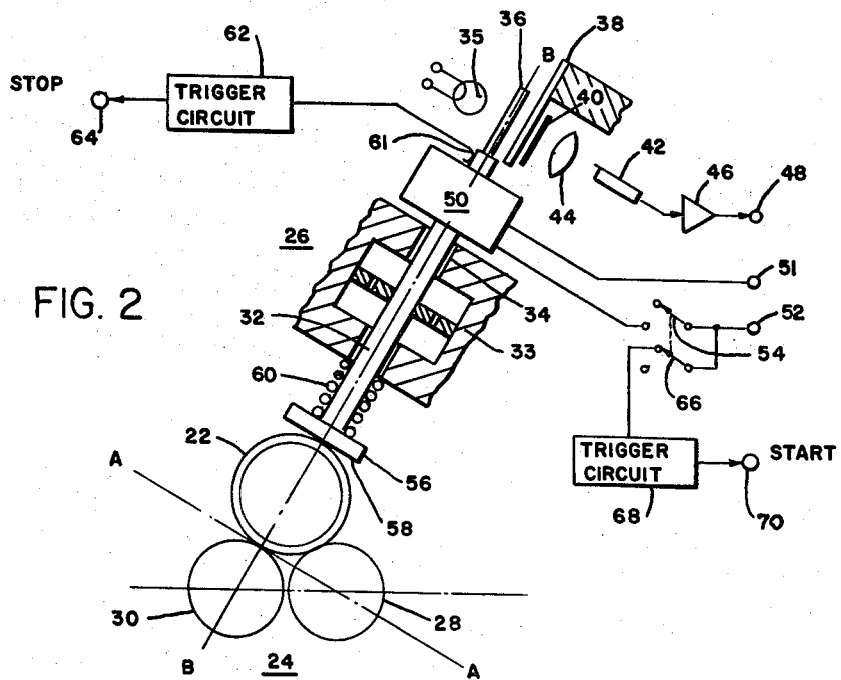
FIGURE 2 is an illustration of the measuring means of FIGURE 1.

The measuring means 14 of FIGURE 1 is illustrated in FIGURE 2 as a photoelectric device for developing the plurality of signal pulses corresponding to the dimension of the device being measured. A device 22 (having a circular cross-section for purposes of illustration) is fed into a measuring jig 24 for measuring its diameter by a measuring tool 26. In the present embodiment the device 22 is automatically fed and located between two rotating rollers 28 and 30 driven to rotate at a constant speed causing the device to rotate rapidly. By rotating the device 22, any eccentricity in a device generates the measurement of the maximum diameter of that device. Although a rotating jig is illustrated, it is to be understood that a stationary jig can also be used, particularly with device having shapes other than circular.

The measuring device 26 includes a movable measuring arbor 32 that can be axially displaced in the slot 34 of the dash pot 33 for movement along the line B—B that is substantially normal to the line A—A to provide a means of obtaining a measurement of the diameter of the device 22. An optical grating 26 is mounted on the arbor 32 and an optical grating 38 is stationary mounted so that the movement of the grating 36 with respect to a lamp 35 produces moire fringes. By way of example, the optical gratings 36 and 38 may include 1000 lines per inch so that when the grating 36 is displaced by an increment in the order of .001″, a moire fringe passes with respect to an entrance slit 40 causing a change in illumination therethrough. The change in illumination is focused on a photosensitive device 42 by a lens 44 so that a signal pulse is generated by the photosensitive device 42 each time a moire fringe is produced. The signal pulses are amplified by an amplifier 46 and applied to a terminal 48.

The arbor 32 is also mounted to pass through a solenoid 50, that is energized by closing the switch 54 connecting the solenoid 50 to a pair of terminals 51 and 52 adapted to be connected to a source of energizing potential. The end of the arbor 32, opposite that with the optical grating 36, includes a rectangular shaped portion 56 having a flat surface 58 extending towards the device 22. A spring 60 is placed between the rectangular shaped portion 56 and the dash pot 33, urging the arbor 32 towards the device 22. When the solenoid 50 is de-energized, the arbor 32 is urged at a substantially constant rate towards the device 22 by the combination action of the spring 60 and the dash-pot 33.

Each time the solenoid 50 is de-energized, the arbor 32 moves from a reference position to engage the device being measured. A series of moire fringes (and also signal pulses) are generated until the surface 58 of the arbor 32 reaches the device 22. If the device 22 is an electrical conductor, the device 22 may make electrical connection through the jig 24 with a reference potential, such as ground, so that the instant the surface 58 reaches the device 22, a circuit is closed through the arbor 32 and a slider device 61 to a trigger circuit 62. The trigger circuit 62 generates an electrical impulse at the stop terminal 64 at the time the surface 58 of the arbor touches the device 22. From the above description it can be seen that a measurement of the diameter of the device 22 is made by counting the number of pulses generated as a result of the movement of the arbor 32 from the reference position (when solenoid 50 is energized) to the time it first makes contact with the device 22. The measuring means as described above has the disadvantage of being able to measure a flexible device with a minimum compression of the device. The measurement stops practically instantaneously when the arbor 56 touches the conducting device. It is to be understood, however, if the device being measured is a non-conducting device, a stationary jig for receiving the device should be used and a time delay circuit could be employed to allow the generation of signal pulses by the measuring means 26 for a time duration sufficient for the arbor 32 to engage the device being measured.

A "start" pulse is generated for synchronizing the measuring period of the system with the de-energization of the solenoid 50 by a switch 66, mechanically coupled to the switch 54, that couples the source terminal 52 to a trigger circuit 68. In response to the closure of the switch 66, the trigger circuit 68 generates a start pulse at the start terminal 70, which in turn is coupled to various portions of the circuit of FIGURE 3 to render the circuit in condition to process the pulses corresponding to a new device being measured.

Figure 3:
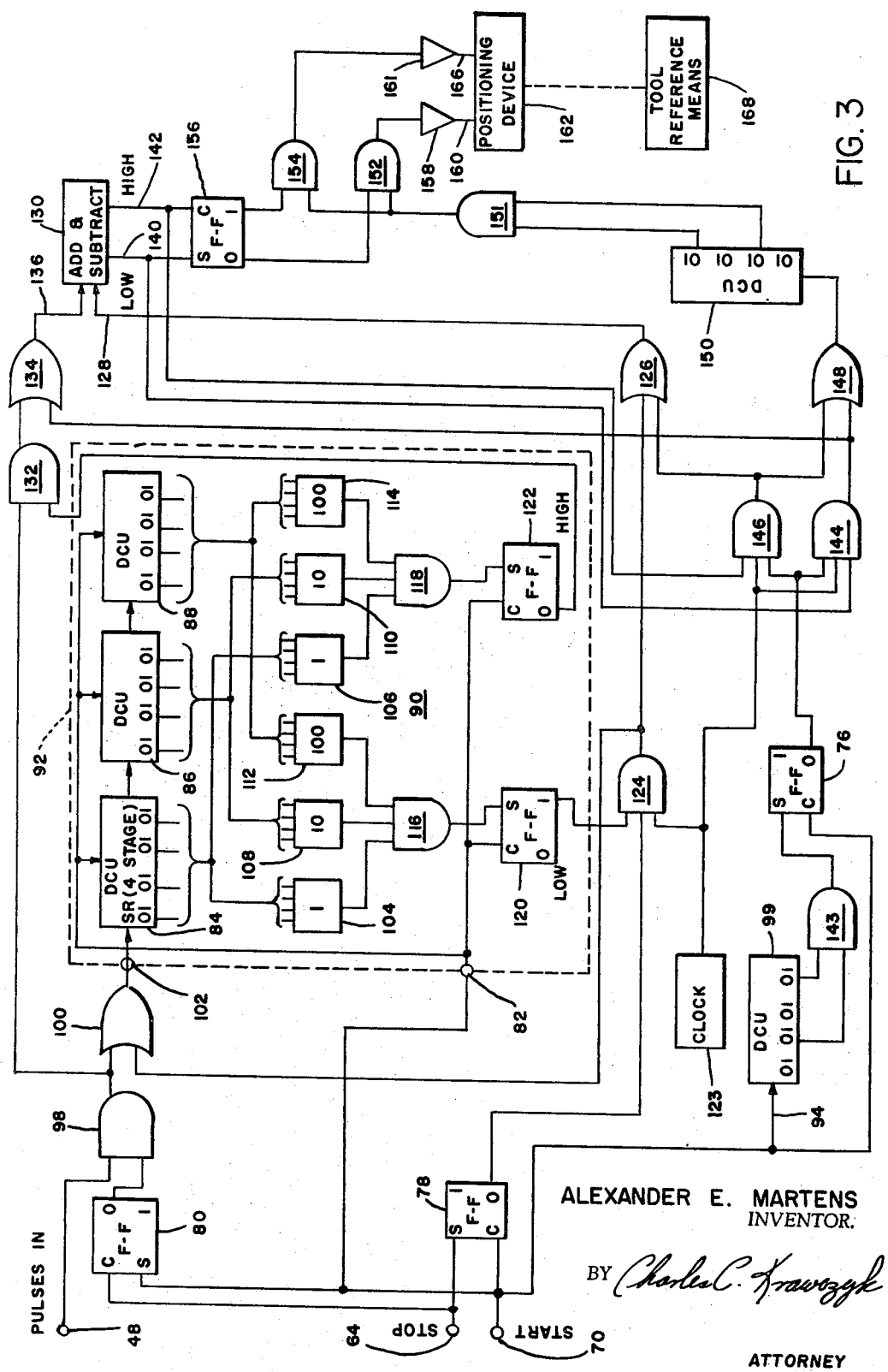
FIGURE 3 is an expanded electrical block diagram of a portion of FIGURE 1.

Referring now to FIGURE 3, the start terminal 70 is coupled to the reset terminal C of the flip-flop (F-F) 76 and 78, to the set terminal S of the flip-flop 80, to the reset terminal 82 of an accumulator circuit 90 (enclosed within a dashed block 92) and to the input circuit 94 of a decimal counting unit (DCU) 99. The decimal counting units of FIGURE 3, may for example, include four flip-flop stages connected as conventional shift registers to accumulate a decade of counts in the binary coded decimal (BCD) system. The flip-flop circuits in FIGURE 3 are illustrated in the reset stage wherein logic "1" and logic "0" output signals are correspondingly designated in the output circuits of the flip-flop circuits. A flip-flop stage is reset by applying a logic "1" to the reset terminal C and set by applying a logic "1" to the set terminal S.

The trigger circuit 68 generates a logic "1" at the start terminal 70 when the arbor 32 is released (solenoid 50 is de-energized) so that the flip-flop stages 76 and 78 are reset, the flip-flop stage 80 is set, the accumulator 90 is reset for a new measuring cycle and the decimal counting unit 99 advances by one count. The flip-flop 80 is coupled to an AND gate circuit 98. The AND gate circuits in FIGURE 3 are of the type wherein logic "1" signal applied to all the gate input circuits generates a logic "1" at the output circuit. When the flip-flop 80 is set by the start pulse, the flip-flop generates a logic "1" which opens the AND gate 98 to pass the signal logic "1" signal pulses generated at the terminal 48 by the trigger circuit 62. The pulses pass through an OR gate circuit 100 to the input terminal 102 of the accumulator circuit 90. The OR gate circuits in FIGURE 3 are of the type wherein a logic "1" is generated at its output whenever a logic "1" is applied to any of its input circuits.

As the name implies, the accumulator circuit 90 accumulates or counts the signal pulses appearing at the terminal 48 when the AND gate 98 is open. The accumulator circuit 90, in the present embodiment, includes three decimal counting units 84, 86 and 88 connected as a conventional three decade shift register that counts in the binary coded decimal system. It is to be understood, however, the accumulator could also count in the natural binary or decimal systems. The decimal counting unit 84 counts each input pulse (units), the decimal counting unit 86 counts once each ten input pulses (tens), while the decimal counting unit 88 counts once each hundred input pulses (hundreds).

The output circuits of the decimal counting units 84, 86 and 88 are connected to the units, tens and hundreds code converting switches 104 and 106, 108 and 110, and 112 and 114 respectively. The code converting switches are conventional commercially available switches that have a visible numerical indicator in the decimal system (0–9) while selecting corresponding output circuits of the connected decimal counting units. The switches 104 and 106 select a digits count (1–9), the switches 108 and 110 select a tens count (10–90) while the switches 112 and 114 select a hundreds count (100–900).

The switches 104, 108 and 112 are presettable to a dimensional unit corresponding to an oversized device (low count) while the switches 106, 110 and 114 are presettable to a dimensional limit corresponding to an undersized device (high count). For purposes of illustration the switches 104, 108 and 112 will be designated low limit switches, while the switches 106, 110 and 114 will be designated as the high limit switches. The output circuits of the low limit switches 104, 108 and 112 are connected to an AND gate 116 while the high limit switches 106, 110 and 114 are connected to an AND gate 118. When the number of pulses corresponding to the number selected by the switches is counted by the decimal counting units 84, 86 and 88, a logic "1" appears at the connected AND gate thereby producing a logic "1" at its output circuit indicating that the designated limit has been reached.

The accumulator reset terminal 82 is connected to the reset inputs of the decimal counting units 84, 86, and 88 and to the reset terminals C of a low limit flip-flop 120 and a high limit flip-flop 122. In response to a logic "1" generated by the trigger circuit 68 (FIGURE 2) the accumulator decimal counting units and low and high flip-flop are reset for a new measuring cycle of operation. The set terminals of the low and high limit flip-flops 120 and 122 are coupled to the AND gates 116 and 118 respectively so that a logic "1" applied thereto sets the flip-flop stage.

To assure that the devices are made by the manufacturing process 12 (FIGURE 1) are within desired tolerance limits, the low and high switches 104, 108 and 112, and 106, 110 and 114 are preset to limits that are more stringent than those of the tolerance limits on the device. One of three situations can exist at the end of a counting period. The measured device can be within, below, or above the preset limits. Each of these possibilities will cause a different sequence of events in the measuring apparatus and are considered separately below.

As previously mentioned, a "stop count" pulse is generated by the trigger circuit 62 (FIGURE 2) at the terminal 64 as soon as the arbor 32 makes contact with the measured device. This pulse (a logic "1") resets the flip-flop 80 which in turn inactivates the AND gate 98 preventing further pulses from reaching the accumulator 90, and also sets the flip-flop 78. With the measured device 22 within tolerance limits, a count is registered in the accumulator 90 sufficient to set the low limit flip-flop 120 but is below that required to set the high limit flip-flop 122. Under these conditions, no further sequencing is carried through by the measuring system.

If on the other hand, the dimension of the measured device 22 is oversized, the number of moire fringes generated by the measuring tool 26 does not exceed a count corresponding to the low preset time selected by the switches 104, 108 and 112. With this condition, the stop pulse generated by the trigger circuit 62 initiates the same events as before (i.e., resetting flip-flop 80 preventing any further impulse from reaching the accumulator 90 and setting the flip-flop 78), but now the low limit flip-flop 120 is still in a reset position. A logic "1" generated by the low limit flip-flop 120 is applied to an AND gae 124. Since the flip-flop 78 is set simultaneously with the stop count pulse, it also applies a second logic "1" to the AND gate 124. A clock 123 is coupled to the third input circuit of the AND gate 124 periodically providing a third logic "1" input, so that periodic output pulses (at the clock frequency) are passed through the AND gate 124. The output circuit of the AND gate 124 is coupled to the OR gate 100 and therethrough to the pulse input circuit 102 of the accumulator 90, and also through an OR gate 126 to the subtract terminal 128 of a conventional adder-subtractor circuit 130. The periodic clock pulses pass through the AND gate 124 until a count corresponding to the low limit preset in the switches 104, 108 and 112 is registered in the accumulator circuit 90 at which time the logic "1" is removed from the AND gate 124 preventing any further passage of the periodic clock pulses. The number of pulses fed into the subtract terminal 128 and stored in the adder-subtractor 130 corresponds to the measurement of the dimension of the device 22 and exceeds the limits selected by the low limit switches.

If the measured dimension of the device 22 is undersized, the accumulator 82 registers a count sufficient to set the low and high limit flip-flops 120 and 122 so that a logic "1" is applied to an AND gate 132. The AND gate 132 is also coupled to receive logic "1" pulse from the AND gate 98 so that the AND gate 132 passes the applied signal pulses through an OR gate 134 to the add terminal 136 of the adder-subtractor circuit 130 until the flip-flop 80 is set (when the arbor 32 reaches the device 22, at which time a stop pulse is generated by the trigger circuit 62 to reset the flip-flop 80). It should be noted that clock pulses do not pass through the AND gate 124 since the stop pulse is not generated until the count has exceeded the maximum tolerance setting.

The adder-subtractor 130 accumulates the counts corresponding to the amount the measured dimension exceeds the high preset limit and compares these counts to those stored from previous measured units to provide an accumulated error count. For example, if the prior counts stored in the adder-subtractor 130 correspond to undersized devices (exceed the high preset limit) a count corresponding to an oversized unit (does not exceed the low preset limit) will be subtracted from the previous count to provide an accumulated error count (i.e., the total number of counts corresponding to the number of undersized units tested less the number of counts corresponding to the number of oversized units tested). If the number of counts corresponding to undersized units (high limit setting) exceeds the number of counts corresponding to oversized units (do not exceed the low limit setting), a logic "0" appears on the adder-subtractor output circuit 140 and a logic "1" on output circuit 142. If the reverse occurs, a logic "0" appears at the output circuit 142 and a logic "1" on the output circuit 140.

As previously mentioned, each start pulse is also applied to the decimal counting unit 99. The decimal counting unit in the present embodiment counts the number of devices 22 measured. Each start pulse advances the shift register in the decimal counting unit 99 by one count. As soon as ten counts have been received a logic "1" is applied to the input terminals of an AND gate 143, which in turn is connected to apply a logic "1" to the set terminal S of the flip-flop 76 setting the flip-flop stage. The flip-flop 76 in turn applies a logic "1" to a first input circuit of a pair of AND gate circuits 144 and 146. Clock pulses from the clock 123 are applied to a second input circuit of the AND gates 144 and 146. The adder subtractor output circuit 140 (corresponding to a higher number of counts corresponding to undersized counts) and 142 (corresponding to a higher number of counts corresponding to oversized counts) are connected to a third input circuit of the AND gates 144 and 146 respectively.

The output circuit of the AND gates 144 and 146 are connected to the OR gates 134 and 126 respectively and both to an OR gate 148. Depending upon which AND gate 144 or 146 receives a logic "1" from the adder-subtractor unit 130, the respective AND gate passes pulses from the clock 123 to a counter in the adder-subtractor circuit 130 until the total accumulated counts therein are cancelled. The same pulses also pass through the OR gate 148 to a decimal counter unit 150. When a count is received corresponding to ten pulses, a logic "1" is applied to the input circuits of an AND gate 151. As a result, one-tenth of the accumulated error count in the counter of the adder-subtractor unit 130 is applied to an input circuit of the AND gates 152 and 154. Since the total error count in the counter of the adder-subtractor 130 was accumulated as a result of measuring ten devices, one-tenth of this total count accumulation represents the average error over ten measurements. The direction of the error is determined by the logic "1" appearing at one of the output circuits 140 and 142.

The output circuits 140 and 142 are also coupled to the set and reset terminals S and C respectively of a direction control flip-flop stage 156. When a logic "1" appears on the output circuit 142 the flip-flop 156 is reset and when the logic "1" appears on the output circuit 140 the flip-flop is set. The output circuits of the flip-flop 156 are coupled to the AND gates 152 and 154 respectively so that when the flip-flop 156 is set, the output pulses from the decimal counter unit 130 AND gate 151 corresponding to the average error pass through the AND gate 152, an amplifier 158 and are applied to a first input circuit 160 of a positioning device 162. When the flip-flop 156 is reset, the pulses pass through the gate 154, an amplifier 161 and to a second input circuit 166 of the positioning device 162.

The positioning device, may for example be, a commercially available electrical stepping motor capable of providing an accurately duplicated output motion in response to a cycle or pulse of a signal applied thereto. The positioning device 162 includes the two input circuits 160 and 166, one for forward motion and the second for reverse motion, wherein the direction of motion is determined by which of the two input circuits the signal is applied. The positioning device 162 is mechanically coupled to the manufacturing tool reference means 168, to move the tool and its drive means in a direction to reduce the average error computed by the system. With the high and low limit switches (104-114) preset to values more stringent than that of the manuturing tolerance limits on the device being built, the measuring apparatus can respond to make corrections before the manufacturing tolerance limits are reached.

A portion of the measuring system of FIGURE 3 is modified in FIGURE 4 to include a reject system for rejecting units that may have exceeded the manufacturing tolerance limit due (to transients, etc.) by adding extra two sets of code converting switches that may be set to the manufacturing tolerance limits. As illustrated, the decimal counting units 84, 86 and 88 are connected to the units, tens, and hundred code converting switches 200 and 202, 204 and 206, and 208 and 210. The maximum manufacturing tolerance limit (oversized) is set in the switches 200, 204 and 208, the output circuits of which are connected to an AND gate 212. The minimum manufacturing tolerance limit (undersized) is set by the switches 202, 206, and 210, the output circuits of which are connected to the AND gate 214. The output circuits of the AND gates 212 and 214 are connected to the set terminals S of the maximum and minimum tolerance flip-flops 216 and 218 respectively. The reset terminals C of the flip-flops 216 and 218 are connected to the start count terminal 82.

When the flip-flops 216 and 218 are originally reset for a new measuring cycle, a logic "1" is coupled from the flip-flop 216 through an OR gate 220 to an AND gate 222. When both the flip-flops 216 and 218 are set, a logic "1" is coupled from the flip-flop 214 through the OR gate 220 to the AND gate 222. The other input circuit of the AND gate 222 is coupled to the flip-flop 78 and receives a logic "1" when the flip-flop is set by a stop pulse applied to the terminal 64.

One of three conditions can exist at the end of the counting period. The measured devices can be within, over or under the manufacturing tolerance. If the device is oversized, the count as preset into the switches 200, 204 and 208 will not be reached and the flip-flop 216 will remain reset so that a logic "1" is applied through the OR gate 220 to the AND gate 222 at the same time the flip-flop 78 is set (also applying a logic "1" to the AND gate 222). A logic "1" developed at the output circuit 222 is amplified by an amplifier 224 and energizes a reject solenoid 226 which in turn can be mounted to force the device 22 being measured into a reject bin. If the device is undersized, the flip-flop 218 is set to provide a logic "1" when the flip-flop 78 is set so that the solenoid 226 is also energized. If the device 22 is within tolerance, the flip-flop 216 is set while the flip-flop 218 remains reset so that the AND gate will remain inactive.

I claim:

1. Apparatus adapted to receive a device having a desired dimension with variations thereabout, and measuring said dimension to establish whether said dimension falls within preset limits comprisng:
    means adapted to receive and maintain said device in a predetermined position;
    means providing a reference position located at a predetermined distance from said means receiving said device;
    measuring means movable from said reference position to engage said device, said measuring means generating plurality electrical signal pulses, the number of which corresponds to the distance moved from said reference position to a point wherein said measuring means engages said device, and
    circuit means coupled to said measuring means receiving said electrical signal pulses and comparing the number of pulses generated to a range of pulses corresponding to a movement of said measuring means engaging a device having a dimension within said preset limits, to determine whether said measured dimension falls within said preset limits.

2. Apparatus as defined in claim 1 including:
    means for generating a reject signal when said number of pulses generated fails to fall within said range of pulses.

3. Apparatus as defined in claim 1 including:
    counter circuit means;
    means for applying error pulses to said counter circuit means corresponding to the number of pulses required to raise the number of said generated signal pulses to within said range of pulses if said number of generated pulses is less than said range;
    means for applying error signal pulses to said counter circuit means corresponding to the number of pulses said generated signal pulses exceeding said range so that said counter circuit means stores a count corresponding to the difference between the error pulses received when said generated signal pulses is below said range and error pulses received when said generated signal pulses exceeds said range, and means for averaging said difference over a plurality of devices measured to provide a signal corresponding to the average dimensional variation exceeding said preset limits.

4. Apparatus adapted to receive a plurality of devices, said devices having a desired dimension with variations thereabout, and measure said dimension of a plurality of devices to provide an electrical signal that is a function of the average dimensional variation beyond a preset tolerance comprising:

first means adapted to receive said devices and generate a plurality of electrical signal pulses, the number of which corresponds to a measured dimension of said device;

second means defining a number of pulses corresponding to said preset tolerance;

third means for receiving said generated pulses and comparing said pulses to said number corresponding to said preset tolerance to determine whether said measured dimension meets said preset tolerance;

fourth means, coupled to said third means for determining and counting signal pulses corresponding to the portion of said measured dimensions that does not meet said preset tolerance, and fifth means for averaging the pulses counted by said fourth means to provide a signal related to the average dimensional variation beyond said preset tolerance of the plurality of devices measured.

5. Apparatus as defined in claim 4 wherein said first means includes:

a movable member adapted to move from a reference position to engage said device, and sixth means coupled to said movable member for generating signal pulses corresponding to the extent of movement of said movable member.

6. Apparatus as defined in claim 5 wherein said sixth means includes:

a source of radiation;

optical means coupled to said movable member for generating pulses of radiation wherein each pulse of radiation corresponds to a predetermined movement of said movable member, and means receiving said pulses of radiation including a radiation sensitive device for generating electrical signal pulses in response to said received pulses of radiation.

7. Apparatus as defined in claim 5 including:

means for maintaining said movable member in said reference position;

means for generating a timing electrical signal when said movable member is released from said reference position;

wherein said third means includes a counter circuit means for counting signal pulses generated by said first means, and means for applying said timing electrical signal to said counter circuit means for rendering said counter circuit means in condition for counting said signal pulses.

8. Apparatus as defined in claim 7 wherein:

said counter circuit means in said third means includes a shift register having a plurality of serially connected counting stages, and wherein said second means defines a range of pulses having high and low count limits corresponding to said preset tolerance and is coupled to selected ones of said counting stages in said shift register so that a control signal is generated when the number of pulses generated by said movable member fails to fall within said range.

9. Apparatus as defined in claim 8 wherein said fourth means includes:

adder-subtractor circuit means coupled to said counter circuit means in said third circuit means;

means responsive to said control signals for applying signal pulses to said adder-subtractor circuit means corresponding to the difference between the number of pulses generated by said first means and said low count limit when said low count limit is not reached;

means responsive to said control signals for applying signal pulses to said adder-subtractor circuit means corresponding to the difference between the number of pulses generated by said first means and said high count limit when said high count limit is exceeded, so that said adder-subtractor circuit means stores a total of pulses corresponding to the difference between the signal pulses applied when said low count limit was not reached and the signal pulses applied when said high count limit was exceeded.

10. Apparatus as defined in claim 9 wherein said fifth means includes:

counter circuit means for counting the number of devices measured for generating a control signal when a predetermined number of devices have been measured, and means responsive to said control signal developed by said counter circuit means and coupled to adder-subtractor circuit means for receiving said difference counts and provide an output signal corresponding to said difference counts divided by the number of counts in said first circuit means related to the average dimensional variation of the number of measured devices.

11. Apparatus adapted to receive a plurality of devices, said devices having a desired dimension with variations thereabout, and measuring said dimension to establish whether said dimension falls within a preset tolerance comprising:

means adapted to receive and maintain said device in a predetermined position;

measuring means movable from a reference position to engage said device, said measuring means generating an electrical signal corresponding to the distance moved from said reference position to a point where said measuring means engages said device, said electrical signal being related to a measured dimension of said device;

circuit means defining an electrical signal standard corresponding to said preset tolerance, said circuit means being coupled to said measuring means to receive said electrical signal and determine whether said electrical signal falls within said standard;

circuit means coupled to said above-mentioned circuit means for generating an error signal corresponding to the difference between said generated electrical signal and said standard when said electrical signal generated by said measuring device does not fall within said standard, and circuit means for averaging said error signal over a plurality of devices measured to provide an output signal corresponding to the average dimensional variation exceeding said tolerance related to the number of devices measured.

12. The combination comprising:

a jig adapted to receive devices having a dimension to be measured;

a member movably mounted to travel from a reference position with respect to said jig adapted to engage a device in said jig;

signal generating means coupled to said member for generating a plurality of signal waves, the number of which is related to the movement of said member;

storage means coupled to said signal generating means for counting said signal waves generated;

switching means coupled to said counting means for variably preselecting a count corresponding to desired high and low counting limits;

circuit means coupled to said switching means for generating a first control signal when the high counting limit is exceeded before said member engages said device;

circuit means coupled to said switching means for generating a second control signal when the low counting limit is not reached when said member engages said device; and means responsive to said first and second control signals coupling said switching circuits to a positioning device to provide a predetermined motion in response to devices measured having measured dimensions which do not fall between the high and low counting limits.

13. The combination as defined in claim 12 wherein said means responsive to said first and second control signal includes:

auxiliary signal wave generating means;

means for applying said signals generated by said auxiliary generating means to said storage means when a count generated by said signal generating means in response to a movement of said member does not reach the low counting limit;

means for averaging the number of said signal waves applied to said storage means by said auxiliary generating means with the number of signal waves generated by said signal generating means in response to a movement of said member that exceeds said high counting limit for a plurality of devices measured, and means for applying said averaged signal waves to said positioning device for providing a movement related to number of waves in said averaged signal waves.

14. The combination as defined in claim 13 wherein said averaging means includes:

an adder-subtractor circuit for determining the difference between the number of signal waves applied to said storage means by said auxiliary generating means and the number of signal waves generated by said signal generating means in response to a movement of said member that exceeds said high count limit;

means for counting the number of devices measured, and means for dividing said difference by the plurality of devices measured to provide a plurality of signal waves corresponding to the average dimensional variation measured that does not fall between said high and low counting limits.

15. The combination as defined in claim 12 wherein:

said means responsive to said first and second control signal includes a switching circuit operative when said device measured does not fall between said high and low limits to apply a control signal to said positioning device.

16. In a manufacturing process including at least one tool for forming a device having a desired dimension and a preset tolerance thereabout, apparatus for automatically controlling said dimension comprising:

means for mounting said tool on a movable base;

motor means for positioning said movable base;

means for receiving said devices and generating electrical signal pulses, the number of which corresponds to a measurement of said dimension;

means for comparing the number of generated signal pulses with a preset range of numbers of pulses corresponding to said preset tolerance and generating error pulses corresponding to the number of pulses by which said generated signal pulses are without said range, means for averaging said error pulses for a plurality of devices measured, and means for applying said averaged error pulses to said motor means so that said motor means moves said base in a direction so that said tool forms devices having a dimension within said preset tolerance.

References Cited

UNITED STATES PATENTS

| | | |
|---|---|---|
| 2,554,171 | 5/1951 | Brunot et al. |
| 3,181,403 | 5/1965 | Sterns et al. |
| 3,268,713 | 8/1966 | Klinikowski. |

SAMUEL S. MATTHEWS, *Primary Examiner.*

U.S. Cl. X.R.

235—92; 209—82, 88; 82—34; 318—162

UNITED STATES PATENT OFFICE
CERTIFICATE OF CORRECTION

Patent No. 3,417,476                                                      December 24, 1968

Alexander E. Martens

It is certified that error appears in the above identified patent and that said Letters Patent are hereby corrected as shown below:

Column 3, line 64, "grating 26" should read -- grating 36 --. Column 4, line 34, "disadvantage" should read -- advantage --.

Signed and sealed this 17th day of March 1970.

(SEAL)
Attest:

Edward M. Fletcher, Jr.                                WILLIAM E. SCHUYLER, JR.
Attesting Officer                                                    Commissioner of Patents